United States Patent Office 3,211,704
Patented Oct. 12, 1965

3,211,704
ETHER LINKED POLYISOCYANURATE PREPARED FROM AN ORGANIC DIISOCYANATE AND AN ORGANIC MONOISOCYANATE IN PRESENCE OF A COCATALYST SYSTEM
Lucius G. Gilman, Wakefield, and Morton H. Gollis, Brookline, Mass., assignors to Monsanto Research Corporation, St. Louis, Mo., a corporation of Delaware
No Drawing. Filed Oct. 31, 1962, Ser. No. 234,512
9 Claims. (Cl. 260—77.5)

This application is a continuation-in-part of our copending application Serial No. 845,593, filed October 12, 1959 now abandoned.

This invention relates to a novel polyisocyanurate and also to the method of producing the same, and more particularly, it pertains to a polyisocyanurate which possesses exceptional characteristics for use as a laminating resin.

Under suitable reaction conditions, a diisocyanate was made to polymerize to a solid product. The conditions of reaction involve temperatures of up to about 125° C. and the use of an ionic polymerization catalyst. In our prior application, of which this is a continuation-in-part, is disclosed our discovery that the diisocyanates can be modified with a monoisocyanate to yield polymeric products having enhanced toughness and stability at elevated temperatures. The polymeric products of this copolymerization, which we designate modified polyisocyanurates, or isocyanurate copolymers, are especially useful as laminating resins.

An object of this invention is to provide a novel polyisocyanurate having toughness and exceptional utility at high temperatures.

Another object of this invention is to provide a method of producing polyisocyanurates having thoughness and exceptional utility at high temperatures.

A further object of this invention is to provide a laminate of glass fabric having exceptional properties for use as a structural material for rocket motors and the like.

Other objects and advantages of this invention will become apparent from the following description and explanation thereof.

It has now unexpectedly been found that tough resins with exceptional oxidative stability at elevated temperatures can be produed by copolymerization of a bis(isocyanato-aryl) ether with an aryl monoisocyanate to produce polymers containing at least about 25 isocyanate ring units joined in a continuous structure.

By an isocyanurate is meant an isocyanate trimer. Trimerization of an isocyanate to an isocyanurate is illustrated by the equation

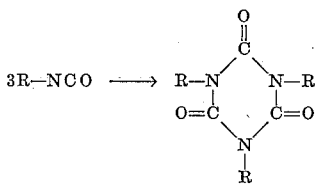

where R is the residue of the isocyanate.

The trimerization of an isocyanate to an isocyanurate ring is sometimes referred to as a polymerization. The trimeric product is a polymer of an isocyanate, in the sense that the repeating unit is the original isocyanate unit. The polymers to which this invention relates, by way of distinction, are polymers of isocyanurates, in which the repeating unit is the isocyanurate ring unit.

A substantial number of such isocyanurate rings as the repetitive units, such as 25 or more, joined in a single molecule by intervening difunctional radicals, form the materials herein designated as tough polymeric products or resins.

In our above-identified copending application, we have disclosed our discovery that polymers can be prepared by copolymerization of a diisocyanate with a monoisocyanate, using an ionic polymerization catalyst, to form polymeric products in which the number of isocyanurate rings with organic substitution joined in a continuous structure in the polymeric molecule is usually at least about 25.

We had discovered that certain diisocyanates can be polymerized alone to produce a polyisocyanurate having the following repeating structural unit:

I. 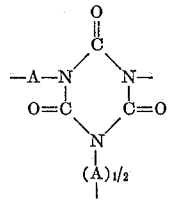

wherein A is a divalent organic radical. It will be noted that the above structural unit is trifunctional, and thus will produce a crosslinked polymer. That crosslinked polymers are produced is borne out by the fact that the polymeric material is infusible and insoluble in either organic or inorganic solvents. The monoisocyanate serves to reduce crosslinking by reacting with one of the radicals of the cyclic structure and thus promote linear polymerization thereof. The product obtained by reacting the diisocyanate with the monoisocyanate has improved toughness and high temperature stability over that produced from the diisocyanate alone.

A copolyisocyanurate illustrative of the polymeric products with at least about 25 organic substituted isocyanurate ring units is produced as described in our above-identified patent application, by copolymerization of a diaryl diisocyanate having an aliphatic group intermediate of the aryl groups containing the isocyanate groups with an aryl monoisocyanate, employing an ionic polymerization catalyst. Illustrative of the stated diisocyanate and monoisocyanate are 4,4'-diphenylmethane diisocyanate and phenyl isocyanate. Their isocyanurate copolymer produces a laminate of outstanding properties: high flexural strength at elevated temperatures, above 500° F., and stability to weight loss in an inert atmosphere at temperatures as high as 700° F. Similar properties are obtained with the isocyanurate copolymers of the stated diisocyanate with m-chlorophenyl isocyanate.

Limits were found to exist to applications of the stated resins, however, in respect to high temperature oxidative stability. Exposure for prolonged times to temperatures above 500° F., which the resins readily withstood in an inert atmosphere, caused failure when the resinous products were exposed to an air flow under the same conditions.

The stated isocyanurate copolymers of 4,4'-diphenylmethane diisocyanate with a phenyl monoisocyanate include a methylene radical as an aliphatic bridging group between aryl rings. Among the diaryl diisocyanates which can be used to prepare our isocyanurate copolymers, as disclosed in the above-identified application, is 2,2-bis(4-isocyanatophenyl)propane. Replacing the hydrogen substituents of a methylene radical with methyl groups can be expected to increase stability. However, the copolymer prepared from the propane compound was found to be actually less stable to thermal oxidative degradation than the methylene-bridged copolymer. Pre-oxidizing the methylene group, by employing 4,4'-benzophenone diisocyanate to prepare the copolymer, would appear to eliminate the possibility of attack at this linking group. In fact, however, resins prepared from the benzophenone diisocyanate monomer were found to exhibit much greater oxidative degradation at elevated temperatures than the methylene-bridged resins.

A standard screening test for thermal stability of resins consists of exposing the resin to increasing temperatures, as by heating at the rate of 150° C. per hour, while the weight loss is measured. This test procedure was also used to compare our modified polyisocyanurates, including aliphatic and non-aliphatic bridging groups, for oxidative thermal stability. From the screening procedure results, showing a similar pattern for all the resins, no significant differences in oxidative stability appeared to exist.

Now, however, it has unexpectedly been found that when bis(isocyanato aryl)ethers are copolymerized with aryl monoisocyanates to form an isocyanurate copolymer in accordance with our invention, the products do, nevertheless, unexpectedly possess significant advantages in high temperature oxidative stability over the isocyanurate polymers of similar structure such as the 4,4'-diphenylmethane diisocyanate/phenyl isocyanate copolymer, especially in laminates. They have twice the oxidative degradation resistance at above 500° F. of the methane-bridged polymers and indeed, the laminates of the ether-bridged products have flexural strengths above 30,000 p.s.i. after 192 hours at 550° F., measured at 550° F.

The polymer prepared in accordance with the present invention contains the following structural units

II.

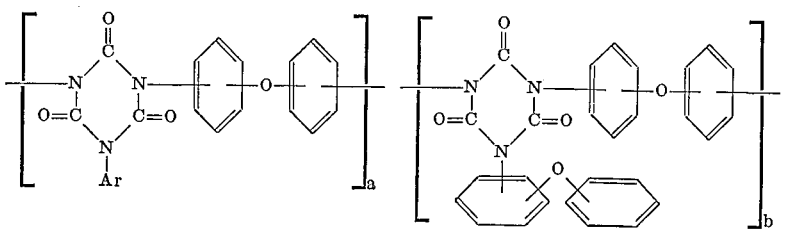

wherein Ar is a monovalent aryl radical which is the same as Ar of Formula IV below, and "a" is an integer of at least about 25, and unusually as high as 400 or higher when "b" is zero, and "b" on the other hand may be zero or an integer ranging up to ten or more times the value of "a" or more usually about 0.1 to 10 times the amount of "a."

As will be evident from the above-stated formula, the present polymers contain at least about 25 difunctional organic substituted isocyanurate rings joined in a continuous structure by divalent phenoxyphenyl radicals and having a monovalent aryl substituent, and trifunctional organic substituted isocyanurate rings, in an amount of up to 10 times the amount of said difunctional rings, wherein the organic substituents of the said trifunctional rings are each divalent phenoxyphenyl radicals.

The polymeric product with particular high temperature oxidative stability of this invention is prepared from a diisocyanate represented by the following structural formula

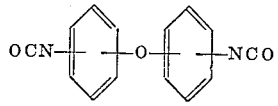

Specific examples of such bis(isocyanatophenyl)ethers are 4,4'-diisocyanatodiphenyl ether, 3,4'-diisocyanatodiphenyl ether, and so forth.

The polymerization of the diisocyanate is conducted in the presence of a monoisocyanate and for the purpose of our invention the monoisocyanates which are useful are those represented by the following structural formula:

IV. Ar—NCO wherein Ar is aryl, alkaryl, mono- or polynuclear aromatic or heterocyclic groups as pyridyl, or the like, a silane group such as

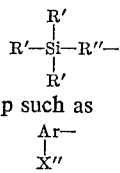

a substituted aryl group such as

Ar—
|
X'' wherein X'' is halogen, alkyl, cyano, etc., and Ar is phenyl, naphthyl or —Ar'—Z—Ar'— wherein Z is oxygen, and Ar' is a phenylene, naphthylene or the like. Specific examples of such monoisocyanates are phenyl isocyanate; para-tolyl isocyanate, 4-cyclohexylphenyl isocyanate, 4-chlorophenyl isocyanate, 3-cyanophenyl isocyanate, 4-methoxyphenyl isocyanate, and the like. Aromatic hydrocarbyl isocyanates such as phenyl isocyanate are especially preferred. The monoisocyanate may be present in any amount relative to the diisocyanate, although for our purposes about 40 mole to 100 mole percent of monoisocyanate based on diisocyanate is particularly useful.

It has been shown that for best results, a balance is needed between the crosslinking (diisocyanate) and linear (monoisocyanate) units so that complete reaction of all isocyanate groups can be effected and still produce a resin that is infusible. Theoretical studies have shown that the distribution of products formed in the trimerization of mixed isocyanates can be controlled by adjusting the relative reaction rates and stoichiometric ratios of the individual isocyanates, and thus desirable ratios of diisocyanate to monoisocyanate in preparing the present resins will advantageously be chosen with reference to the reactivity ratio of the comonomer pair.

The polymerization reaction is catalyzed by means of a catalyst which induces ionic polymerization and may include a strong base of an organic or inorganic type as long as it does not effect adversely to any significant extent the desired product materials. The strong bases include, for example tertiary amines, including alkyl tertiary amines, aromatic tertiary amines or heterocyclic tertiary amines, e.g., triethylamine, pyridine, 1,4-diazabicyclo[2.2.2]octane, etc.; alkali or alkaline earth metal salts of low molecular weight carboxylic acids such as those containing about 1 to 3 carbon atoms, e.g., sodium carbonate, sodium acetate, potassium acetate, etc.; alkali metal alkoxides, e.g., sodium methoxide, potassium propoxide etc.; organic tertiary phosphines, e.g., triethylphosphine, dimethylphenylphosphine and the like.

From the compounds enumerated above it will be readily apparent to one skilled in the art that the catalyst is one which induces ionic polymerization and is designated for the purpose of this specification as an ionic polymerization catalyst in the generic sense. The quantity of catalyst employed for the reaction may vary over wide limits, but in general about 0.1 mole percent to 50 mole percent, preferably about 0.1 to 5 mole percent of a strong base catalyst such as the bicyclo compound, or preferably about 20 to 50 mole percent of a weaker base catalyst such as triethylamine, based on monomer starting material, may be employed.

The catalysis of the polymerization reaction may be enchanced by the additional use of an organic epoxide. The organic epoxide is miscible and/or soluble with the diisocyanate monomer. The epoxide includes aromatic and aliphatic compounds such as, for example, epihalohydrins, e.g., epichlorohydrin, etc.; alkylene oxides, e.g., propylene oxide, styrene oxide, etc.; alkenyl oxide, e.g., butadiene mono- or dioxide, etc.; glycidyl esters, e.g., ethyl glycidate, etc. Generally the presence of the opoxy group enhances catalysis, and the compound thereof is wholly or partly miscible or soluble with the monomer. The amount of organic epoxide employed with the ionic polymerization catalyst may vary considerably, but in general up to 100 mole percent, preferably about 0.1 to 10 mole percent of organic epoxide when using a strong base catalyst such as the bicyclo compound, or preferably about 20 to 50 mole percent when using a weaker base catalyst such as triethylamine, may be used.

Reaction conditions conducive to the desired stability of the product resin include purity of reaction mixture components, especially the isocyanate reactants, and essentially anhydrous conditions until substantially all the isocyanate groups have reacted.

The polymerization reaction is conducted in liquid phase by either employing a temperature at which the materials are in that state, involving the same in bulk form or by the use of a suitable solvent. By either method the polymerization temperature may vary from about ambient level to about 125° C. with the upper limit being determined by the fact that adverse effects tend to become noticeable above the same. However, in some instances temperatures above 125° C. may be used. After the polymerization at up to 125° C., the resin can be heated to more elevated temperatures, into the range of 300–400° C., to drive off solvent and effect post-cure. While the temperature of reaction may vary with pressure, nevertheless it is contemplated employing atmospheric pressure for the temperature range given above. On the other hand, if desired the reaction may be conducted at subatmospheric or superatmospheric pressure and in this case the temperature may be varied outside the range herein given. When the reactants are employed in bulk form, that is, without a solvent, it is preferred to conduct the polymerization at a temperature of about ambient level to 75° C., in contrast to a preferred temperature of about 50° C. to 125° C. when using a solvent. Optimum temperatures for polymerization are generally decreased as the amount of solvent is decreased and the conditions approach bulk polymerization. Using less solvent than monomer (on a weight basis), it has been found advantageous to use a temperature of about 50° C. until gelation, and subsequently raise the temperature to about 125° C. before discontinuing heating. The time required for the polymerization reaction to be substantially completed may vary considerably depending upon the type of polymer employed and whether or not a solvent is used. When the reaction is effected in bulk, it may take up to about 5 minutes for substantial completion and be considerably longer when a solvent is used in the reaction. With a solvent the reaction may take up to about two hours for substantial completion. The reaction time can be shortened to suit the particular needs of a situation or for that matter lengthened, without departing from the scope of the present invention.

The solvent employed for the polymerization reaction can be any one or more of those commonly employed for the same purpose. To be effective the solvent is one in which the monomer and lower molecular weight reaction products are miscible or soluble. Specific examples of solvents which are useful for the present invention are dimethylformamide, dimethylsulfoxide, 1,2-dichloroethane, trichloroethylene, etc. The solvent is used in amounts to provide a medium in which the reaction occurs or as a diluent to slow down the reaction, and therefore, it can vary over wide limits for the purposes of the present invention. Generally about 0.1 to 20 parts by weight of solvent per part of monomer starting material are employed. Such quantities of solvent are merely illustrative of the range which can be used for the present invention.

As previously indicated, the monoisocyanate modifies the polymer obtained from the polymerization of diisocyanate to yield a material having enhanced toughness and stability at elevated temperatures over the product prepared solely from a diisocyanate. The modified polymers are espeically useful as laminating resins for sheets of glass fabric or as a reinforcement material for glass filament which is wound spirally into a cylindrical shape. The laminated sheets of glass fabric have especial use as radomes for aircraft. Some advantages of the present invention reside in the facts that the diisocyanate starting material is sufficiently low in viscosity to permit easy application to sheets of glass fabric and the polymerization reaction during lamination can proceed at atmospheric pressure. Fortunately the diisocyanate wets the glass fabric, which result of itself is unusual because it eliminates a series difficulty which is common among other types of laminating materials. After the sheets of glass fabric have been coated with the diisocyanate and monoisocyanate containing the ionic polymerization catalyst, the coated sheets are placed in face-to-face contact and permitted to remain in this position until sufficient resin has been produced to bind the same. As additional uses for those polymers there may be listed adhesives for joining surfaces such as metal to metal, wood to wood, paper to paper, or dissimilar materials; potting compositions for use in the construction of magnet coils or electronic assemblies; or wire insulation.

In order to provide a fuller understanding of the present invention reference will be had to specific examples which form a part of this specification.

Example 1

This example illustrates preparation of a bis(isocyanatoaryl) ether/aryl isocyanate copolyisocyanurate.

A mixture is prepared of 4,4'-diisocyanato diphenyl ether and phenyl isocyanate in a molar ratio of 1:0.35, respectively, and 0.0099 mole of styrene oxide and 0.0086 mole of 1,4-diazabicyclo[2.2.2]octane per mole of the ether are added to the mixture, as solutions in dry dimethylsulfoxide, providing 60 milliliters (ml.) of the sulfoxide solvent per mole of the ether. Heating the mixture at 100° C. for one hour provides a clear, transparent solution of high molecular weight isocyanurate copolymer. The solvent is now removed by heating the resin for one hour at 600° F. at <1 millimeter (mm.) Hg.

The resulting copolymer of 4,4'-diisocyanato diphenyl ether and phenyl isocyanate is a dark brown resin with a softening point above 750° F. After grinding to 20 mesh it is submitted to the thermogravimetric analysis in air. Heated from room temperature at the rate of 150° C. per hour, it exhibits an initial decomposition temperature of about 680° F. Heated at constant temperature in air while the weight loss is measured, the weight loss at 550° F. is about one percent per day.

The thermogravimetric analysis data are obtained using a thermogravimetric balance consisting of a 500 mg. capacity (2 mg. division) torsion balance, immediately below the right hand arm of which is mounted vertically a furnace comprising a 3 x 40 centimeter (cm.) quartz tube wound with resistance wire and insulated with asbestos. The upper end of the quartz tube furnace is provided with an opening to accommodate a microporcelain crucible which is suspended within the furnace from the right hand balance arm by a fine wire. The lower end of the furnace is connected to a combination gas inlet and thermometer guide tube. Precision of temperature control using air or nitrogen flow of 100 ml. per minute is ±3° C.

For analysis, a weighed sample of material is suspended in the crucible within the furnace while the temperature is controlled by the voltage applied to the furnace heater. For oxidative degradation resistance measurements, an air flow of 100 ml. per minute of air through the gas inlet at the lower end of the furnace is used. Readings are made of the initial weight of the sample and the weight after predetermined periods of time.

*Example 2*

This example describes comparisons of the 4,4'-diisocyanato diphenyl ether copolymers with phenyl isocyanate and with m-chlorophenyl isocyanate with the corresponding copolymers of 4,4'-diphenyl diisocyanates having an aliphatic bridging group.

A series of isocyanurate copolymers of mono with diisocyanates are prepared by the procedure described in Example 1, using in each case the same molar ratios of diisocyanate, monoisocyanate, styrene oxide and 1,4-diazabicyclo[2.2.2]octane and the same ratio of dimethylsulfoxide solvent as in Example 1. The procedure used to form the resin and to effect removal of solvent is precisely as described in Example 1, except that to ensure homogenous mixes are obtained with the propane-bridged and carbonyl-bridged diaryl diisocyanates, which are high melting materials, the reaction mixture is heated 2 minutes at 356° F. prior to addition of the bicyclo catalyst.

Preparation of the benzophenone diisocyanate is conducted by bubbling dry HCl into a solution of 0.129 mole of 4,4'-diaminobenzophenone in 450 ml. of diglyme at about 100° C. to form the dihydrochloride, and then heating the slurry at 162° C. for 2.5 hours while phosgene is added. The resulting clear solution is cooled and filtered, the filtrate concentrated by ways of vacuum distillation, and the resulting precipitate purified by sublimation, to isolate 8.0 grams of product giving a single peak on VPC. 4,4'-diisocyanatobenzophenone is a solid, M. 175–76° C.

The isocyanates employed to prepare the resins of this example are indicated in the following table. All the resins produced had softening points, after postcure, of above 750° F. For measuring oxidative stability, the post-cured resins are each ground to 20 mesh and exposed in the above-described thermogravimetric analysis apparatus to 700° F. in air for one hour while the weight loss is measured. The results obtained are set forth in the following table, from which it will be seen that the ether resin has the lowest weight loss values in this test.

| Diisocyanate | Percent Weight Loss | |
|---|---|---|
| | Copolyisocyanurate with phenyl isocyanate | Copolyisocyanurate with m-chlorophenyl isocyanate |
| OCN—⌬—O—⌬—NCO | 1.3 | 4.3 |
| OCN—⌬—CH₂—⌬—NCO (2 samples) | 2.9, 2.8 | 7.5, 6.4 |
| OCN—⌬—C(CH₃)₂—⌬—NCO | 3.9 | |
| OCN—⌬—CO—⌬—NCO | 10.9 | |

*Example 3*

This example describes another comparison of the ether diisocyanate isocyanurate copolymer with similar polymers in which the ether bridge is replaced by an aliphatic bridging group.

Copolymers of phenyl isocyanate with 4,4'-diphenylmethane diisocyanate, with 2,2-bis(4-isocyanatophenyl)-propane and with 4,4'-diisocyanato diphenyl ether are prepared by heating the monomeric mixture at 100° C. for 1 hour with styrene oxide and diazobicyclo octane as described in the preceeding examples, but using half the amounts of reactants. The diisocyanate/monoisocyanate mixture with the oxide cocatalyst is heated for two minutes at 180° C. prior to addition of the diazobicyclo octane and heating at 100° C. in all of these preparations, and each preparation is run in triplicate.

The resulting resins, after post-curing as described hereinabove and grinding to 20 mesh to measurement of weight loss in the thermogravimetric analysis apparatus, are exposed to 700° F. in air for 2 hours. Again the ether shows twice the resistance to oxidative degradation possessed by the aliphati-bridged polyisocyanurates.

| Diisocyanate: | Copolymer with phenyl isocyanate, percent wt. loss after 2 hrs. at 700° F./air |
|---|---|
| 4,4'-diphenylmethane-diisocyanate | 9.3±0.5 |
| 2,2-(4,4'-diisocyanatodiphenyl) propane | 9.8±0.8 |
| 4,4'-diisocyanatodiphenylether | 4.3±0.4 |

Samples of the methane-bridged and the ether bridged copolymers with phenyl isocyanate are also subjected to thermo-gravimetric analysis in air at 600° F. for times up to 40 hours. These longer-term tests confirm the trend shown by the 1 and 2 hour measurements. For the ether-bridged polymer, the weight loss is below 5% at the end of 40 hours. For the methane-bridged polymer, it is between 5 and 10% at the end of only 20 hours.

*Example 4*

This example describes preparation of a laminate.

The amounts of materials used in preparation of the resinous portion of the laminate are as follows:

| | |
|---|---|
| 4,4'-diisocyanatodiphenyl ether | g 38.2 |
| Phenyl isocyanate | g 6.3 |
| Styrene oxide | g 0.16 |
| 1,4-diazabicyclo[2.2.2]octane, as a 0.72 M solution in dimethylsulfoxide | ml 1.8 |
| Dimethylsulfoxide (dried and redistilled) | ml 7.0 |

The isocyanates are mixed with the styrene oxide and dimethylsulfoxide and then held at 180° C. for about 2 minutes, until the mixture becomes transparent. Then the solution is cooled to room temperature and the diazobicyclo octane solution is added. Now the resin formulation is poured between and over 14 predried, style 181, A1100 γ-aminopropyl silane finish, glass cloth 4.5 x 5.5 in. plies in a mold. The mold is placed in a press preheated to 125° F. (52° C.) and pressure (40 p.s.i.) is applied while the assembly is maintained at 125° F. After about 15 minutes, the exudate of polymer has become sufficiently viscous to form threads. The pressure is now raised to 785 p.s.i., while maintaining the heating at 125° F. for 1 hour. At this point the polymer gel structure has formed. Now the temperature is raised at 10 minute intervals to 150°, 175°, and 200° F., and then maintained at 200° F. for 1 hour. Initial cure is now complete and the laminate can be cooled and removed from the press. For post-curing, the cooled laminate is wrapped in aluminum foil (0.0015 inch) and reinserted in the press at 200° F., where it is maintained under 785 p.s.i. pressure while the temperature is raised 30° F. per 10 minutes until 600° F. is reached and then maintained at 600° F. for 1 hour. The resulting laminate is a brown, strong and rigid structure.

Samples of this laminate are trimmed off from the whole piece using a water-cooled, diamond-edged circular saw and the flexural properties measured. Determination of the flexural strength and modulus of the specimens follows method 1031 of Federal Test Method Standard 406, except that the specimens are ½ inch in width instead of 1 inch. Measurements of the flexural strength and modulus made in these tests are made at the temperature of exposure, and not after cooling to room temperature.

Results of the tests are as follows:

| Test Conditions | Flexural Strength, p.s.i. | Flexural Modulus, p.s.i. |
| --- | --- | --- |
| Room temperature | 73,300 | $3.3 \times 10^6$ |
| ½ hr. at 500° F | 32,200 | $2.9 \times 10^6$ |
|  | 36,900 | $2.8 \times 10^6$ |
| 192 hr. at 550° F | 35,700 | $2.8 \times 10^6$ |
|  | 32,800 | $2.9 \times 10^6$ |
| 72 hr. at 600° F | 45,000 | $3.0 \times 10^6$ |

By way of comparison, the 4,4'-diphenylmethane diisocyanate copolymer with m-chlorophenyl isocyanate, at a ratio of 105 to 22.8 parts by weight respectively, made using the bicyclo catalyst and styrene oxide cocatalyst with dimethylsulfioxide solvent, is a strong, tough resin. When it is made into laminates with 14 glass cloth plies substantially as described above, data on over 50 samples show that its room temperature flexural strengths (measured by federal specification method LP–406B) average about 70,000 p.s.i., and the average flexural modulus at room temperature is about $3.4 \times 10^6$. After ½ hour at 500° F., its 500° F. properites are actually better than those given above for the ether-linked product: average flexural strengths of about 50,000 p.s.i. and flexural moduli about $3 \times 10^6$. Heated 192 hours in nitrogen at 550° F., flexural strengths of between 45,000 and 50,000 p.s.i. and moduli of above $2.9 \times 10^6$ are measured at 550° F. However, it cannot be compared with the ether-linked polyisocyanurate laminate after long-term exposure to air: heating 192 hours at 550 F. in air burns the resin off from the laminate, leaving loose, delaminated glass cloth pieces.

Similar results are observed when a laminate is prepared from 34.2 g. of 4,4'-dipenylmethane diisocyanate, 5.6 g. of phenylisocyanate and 0.16 g. styrene oxide, 0.13 g. of the diazobicyclo octane and 8.7 g. dimethylsulfoxide, providing molar ratios as in the above-described procedure. This mixture is combined, applied to glass cloth plies and cured exactly as described above for the ether diisocyanate polymerization, to form a laminate, providing a strong, hard structure which, as described in our above-identified application, is stable for hundreds of hours when heated in nitrogen at temperatures as high as 700° F. However, after 192 hours at 550° F. in air, so much weight loss has occurred due to oxidative degradation of the resin that the laminate, even at room temperature, can be cracked and delaminated by hand. The resin has decomposed to a powder devoid of adhesive power for the glass cloth. The flexural strength of the laminate after this degradation is less than 1000 p.s.i., which is below the minimum threshold of the test equipment.

While the invention has been described with reference to various particular preferred embodiments thereof, it is to be appreciated that modification and variations can be made without departing from the scope of the invention, which is limited only as defined in the appended claims.

What is claimed is:

1. A solid, tough polyisocyanurate with oxidative thermal stability, containing at least about 25 difunctional organic substituted isocyanurate rings joined in a continuous structure by divalent phenoxyphenyl radicals and having a monovalent aryl radical substituent, and containing trifunctional organic substituted isocyanurate rings in an amount of up to 10 times the amount of said difunctional rings, wherein the organic substituents of the said trifunctional rings are divalent phenoxyphenyl radicals, said polymer containing the structural units

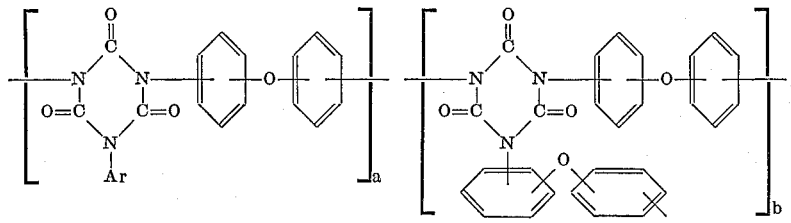

wherein Ar is a monovalent aryl radical, "a" is an integer of at least 25, and "b" is an integer of from 0 to 10 times the value of "a".

2. The polymers of claim 1 in which the said monovalent aryl radical is aromatic hydrocarbon.

3. The polymers of claim 2 in which the said monovalent aryl radical is phenyl.

4. The method which comprises mixing a bis(isocyanatophenyl)ether of the formula

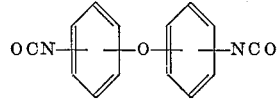

and an aryl monoisocyanate with an ionic polymerization catalyst and an organic epoxide and reacting and heating the resulting mixture until a polyisocyanurate is formed containing at least about 25 organic substituted isocyanurate rings joined in a continuous structure.

5. The method of claim 4 in which the said aryl monoisocyanate is phenyl isocyanate.

6. The method of claim 4 further characterized by conducting the polymerization in a solvent for the diisocyanate, monoisocyanate and the resultant polymeric product.

7. An article of manufacture comprising a plurality of sheets of glass fabric bonded together by means of the polymer of claim 1.

8. A laminate comprising a plurality of glass fabric sheets bonded together by means of the polymer of claim 3.

9. A method of bonding sheets of glass fabric together which comprises coating the surface thereof with a bis(isocyanatophenyl)ether of the formula

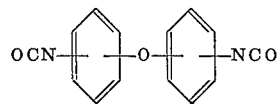

an aryl monoisocyanate, and orgainc epoxide and an ionic polymerization catalyst, placing the coated sheets in face-to-face contact and heating the assembly to produce formation of a polyisocyanurate containing at least about 25 organic substituted isocyanurate rings joined in a continuous structure.

References Cited by the Examiner

UNITED STATES PATENTS

| | | | |
|---|---|---|---|
| 2,977,360 | 3/61 | Dixon | 260—248 |
| 2,978,449 | 4/61 | France | 260—77.5 |
| 2,979,485 | 4/61 | Burkus | 260—77.5 |

OTHER REFERENCES

Angewandte Chemie, September 1947, page 268, footnote 67.

I.C.I. (Belgium Derwent Abstract, vol. 57A), No. 576,022 (September 1959).

LEON J. BERCOVITZ, *Primary Examiner.*

DONALD E. CZAJA, *Examiner.*